(12) United States Patent
Uesu et al.

(10) Patent No.: US 10,072,699 B2
(45) Date of Patent: Sep. 11, 2018

(54) BEARING APPARATUS OF CRANKSHAFT FOR INTERNAL COMBUSTION ENGINE

(71) Applicant: DAIDO METAL COMPANY LTD., Nagoya (JP)

(72) Inventors: Yusuke Uesu, Inuyama (JP); Yasushi Saito, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 15/480,488

(22) Filed: Apr. 6, 2017

(65) Prior Publication Data

US 2017/0292560 A1    Oct. 12, 2017

(30) Foreign Application Priority Data

Apr. 8, 2016 (JP) .................. 2016-078216

(51) Int. Cl.

| F16C 9/02 | (2006.01) |
| F16C 33/04 | (2006.01) |
| F01M 1/06 | (2006.01) |
| F01M 11/02 | (2006.01) |
| F16C 3/14 | (2006.01) |

(Continued)

(52) U.S. Cl.
CPC .................. *F16C 9/02* (2013.01); *F01M 1/06* (2013.01); *F01M 11/02* (2013.01); *F16C 3/14* (2013.01); *F16C 33/046* (2013.01); *F16C 33/1065* (2013.01); *F01M 2001/062* (2013.01); *F01M 2011/026* (2013.01); *F02F 7/0053* (2013.01)

(58) Field of Classification Search
CPC ...... F16C 3/04; F16C 3/14; F16C 9/02; F16C 17/022; F16C 19/14; F16C 33/046; F16C 33/6666; F16C 33/1045; F16C 2204/10; F16C 2204/20; F01M 1/06; F01M 2001/062; F01M 11/02; F01M 2011/026
See application file for complete search history.

(56) References Cited

U.S. PATENT DOCUMENTS 6,491,438 B1* 12/2002 Ono .................. F16C 9/02
                                                  384/288
7,281,854 B2* 10/2007 Terada .................. F01M 1/06
                                                  384/288

(Continued)

FOREIGN PATENT DOCUMENTS

| JP | 08-277831 | 10/1996 |
| JP | 2006-125565 | 5/2006 |
| WO | WO 2004/038188 | 5/2004 |

*Primary Examiner* — Alan B Waits
(74) *Attorney, Agent, or Firm* — Snyder, Clark, Lesch & Chung, LLP (57) ABSTRACT

The bearing apparatus 1 includes a crankshaft having multiple journals, main bearings supporting the crankshaft, and a bearing housing. The plurality of journals include a first journal with a lubricating oil passage and a second journal without a lubricating oil passage. The first and second journals are supported by first and second main bearings, respectively. The bearing housing is constituted by an Al-alloy upper housing and an Fe-alloy lower housing. The depth of the oil groove of the upper half bearing of the second main bearing at least in a ±45° region is equal to or smaller than a half of the depth of the oil groove of the upper half bearing of the first main bearing in the ±45° region.

4 Claims, 8 Drawing Sheets

(51) Int. Cl.
*F16C 33/10* (2006.01)
*F02F 7/00* (2006.01)

(56) References Cited

U.S. PATENT DOCUMENTS

| | | | | |
|---|---|---|---|---|
| 8,317,401 | B2* | 11/2012 | Matsuyama | F16C 9/02 384/288 |
| 8,608,385 | B2* | 12/2013 | Ovares | F16C 9/02 384/283 |
| 2005/0047689 | A1* | 3/2005 | Yamazaki | F16C 9/02 384/288 |
| 2005/0263125 | A1* | 12/2005 | Terada | F01M 1/06 123/196 R |
| 2010/0316312 | A1* | 12/2010 | Maitani | F16C 9/00 384/288 |
| 2012/0294558 | A1* | 11/2012 | Ovares | F16C 9/02 384/288 |
| 2017/0152885 | A1* | 6/2017 | Kato | F01M 11/02 |

* cited by examiner

BEARING APPARATUS OF CRANKSHAFT FOR INTERNAL COMBUSTION ENGINE

INCORPORATION BY REFERENCE

The present application claims priority from JP Patent Application Ser. No. 2016-078216 filed on Apr. 8, 2016, the content of which is hereby incorporated by reference into this application.

BACKGROUND OF THE INVENTION

(1) Field of the Invention

The present invention relates to a bearing apparatus of a crankshaft for an internal combustion engine.

(2) Description of Related Art

A crankshaft for a multi-cylinder internal combustion engine has a plurality of journals and a plurality of crankpins. The journals include a journal A that has a lubricating oil passage for supplying oil to the crankpin (hereafter simply referred to as "journal A") and a journal B that does not have such a lubricating oil passage (hereafter simply referred to as "journal B"). The crankshaft is supported by a lower section of the cylinder block of the internal combustion engine at the journal A via the main bearing A and at the journal B via the main bearing B. The main bearings A and B take a shape of a cylinder by mounting a pair of half bearings to a bearing holding hole of the bearing housing. The bearing housing is constituted by an upper housing which is part of the cylinder block and a lower housing which is a bearing cap. In order to lubricate the main bearings A and B, oil that has been discharged by an oil pump is delivered into oil grooves formed along the inner circumferential surfaces of the main bearings A and B via an oil gallery formed in the wall of the cylinder block and through-holes formed in the walls of the main bearings A and B. A first lubricating oil passage is formed in and through the journal A in the direction parallel to the diameter of the journal A and brought into communication with the oil groove of the main bearing A via its openings at its both ends. Further, a second lubricating oil passage is formed such that it branches from the first lubricating oil passage and passes through a crank arm, and brought into communication with a third lubricating oil passage formed through the crankpin in a direction parallel to its diameter. Accordingly, the oil delivered into the oil groove of the main bearing A passes through the first lubricating oil passage, the second lubricating oil passage, and the third lubricating oil passage, and subsequently supplied to a sliding surface between the crankpin and a connecting rod bearing via an opening at the end of the third lubricating oil passage (an oil outlet formed on the outer circumferential surface of the crankpin).

The main bearing A and the main bearing B that are used here have the same shape. An oil groove is formed in an inner circumferential surface of at least one of the pair of half bearings constituting the main bearing, and the oil groove is formed for the entire length of the half bearing in the circumferential direction (FIG. 1 of JP-A-08-277831). In this case, oil exceeding the amount necessary for lubrication of the inner circumferential surface of the main bearing B is supplied to the main bearing B.

With regard to the main bearing B, a bearing apparatus has been proposed according to which an oil groove of a half bearing BU on the side of a cylinder block is eliminated and oil supplied via an oil hole formed through the inner circumferential surface and the outer circumferential surface of the half bearing BU is made to flow into a gap between the inner circumferential surface of the main bearing B and the surface of the journal B so as to reduce the amount of oil supplied to the main bearing B (International Publication No. WO2004/038188). Further, according to the main bearing A of this bearing apparatus, both ends in the circumferential direction of the oil groove formed in the inner circumferential surface of one half bearing AU along the circumferential direction is not in communication with a crash relief formed at both ends in the circumferential direction of the inner circumferential surface of the half bearing AU. In this manner, since the oil groove of the half bearing AU is configured as a partial groove, the oil in the oil groove is prevented from flowing to the outside of the main bearing A via the gap caused by the crash relief. According to the bearing apparatus of International Publication No. WO2004/038188, it is made possible to reduce the amount of oil supplied to plurality of the main bearings A and B of the bearing apparatus and thereby realize a small oil pump and low fuel consumption for the internal combustion engine.

JP-A-2006-125565 addresses the technical problem of overcoming the drawback that the bearing apparatus (disclosed in FIG. 5) of the International Publication No. WO2004/038188 causes degradation in durability of the main bearing B because of insufficient cooling of the main bearing B. According to the bearing apparatus disclosed in JP-A-2006-125565, a partial oil groove is formed in the inner circumferential surface of one half bearing BU of the main bearing B, and this oil groove extends in the circumferential direction of the inner circumferential surface including the central portion in the circumferential direction of the half bearing BU and is formed such that it almost reaches both ends in the circumferential direction (paragraph [0009]). By virtue of this, it is made possible to increase the amount of oil supplied to the inner circumferential surface of the main bearing B, so that degradation of durability of the main bearing B can be prevented. It should be noted here that an oil groove is formed in the main bearing A of the bearing apparatus of JP-A-2006-125565 for the entire length in the inner circumferential surface of one of the half bearing AU. According to the bearing apparatus of JP-A-2006-125565, since the amount of oil supply to the main bearing B is increased, it is necessary to make the oil pump larger. As the oil pump is operated by virtue of a rotational force of the crankshaft, a larger oil pump entails increase in the mechanical loss in the internal combustion engine.

Moreover, in the trend in recent years of adopting aluminum alloy for the cylinder block to reduce weights of internal combustion engines for automobiles, the bearing housing of the main bearing is constituted by an aluminum (Al) alloy upper housing which is part of the cylinder block and an iron (Fe) alloy lower housing which is a bearing cap. When this bearing housing is used in combination with the bearing apparatus of JP-A-2006-125565, the following problems need to be addressed. When the internal combustion engine is started (in particular, when the engine is to be started while the bearing apparatus is in the state of low temperature in a cold region), the oil is hard to be supplied to the sliding surface of the half bearing BL having no oil groove formed therein and incorporated on the side of the Fe-alloy bearing cap, and seizure on the inner circumferential surface of the half bearing BL may occur.

A bearing gap for supplying the oil is provided between the inner circumferential surface of the main bearing and the surface of the journal of the crankshaft. When this bearing gap becomes excessively large, axial runout of the crankshaft occurs, causing vibration and noise of the internal combustion engine. When a bearing housing constituted by an Al-alloy upper housing and an Fe-alloy lower housing is adopted, the thermal expansion rates of the Al-alloy housing and the journal of the Fe-alloy crankshaft differ from each other, so that the bearing gap changes due to changes in the temperature. In the bearing apparatus of the internal combustion engine for an automobile, the bearing gap is designed to become narrow at a temperature of the bearing housing in the normal operation (e.g., 120° C.) for ensuring the capability of quiet operation of the internal combustion engine. When the temperature of the bearing housing becomes low, the bearing gap changes so that it becomes narrower. Since an internal combustion engine for an automobile is started in a cold region with the bearing housing in a state of low temperature (e.g., about −30° C.), the bearing gap is extremely narrowed due to the difference in the thermal expansion rate between the Al-alloy housing and the Fe-alloy crankshaft. Further, viscosity of the oil is high in this state.

According to the bearing apparatus of JP-A-2006-125565, the oil in the partial oil groove provided in the inner circumferential surface of the half bearing BU mounted in the Al-alloy upper housing is placed in a state of high viscosity. In addition, the bearing gap between the inner circumferential surface of the half bearing BU and the surface of the journal is extremely narrow. As a result, the oil is hard to flow from the oil groove to the outside. Accordingly, the oil is not supplied quickly at an early stage to the inner circumferential surface of the other half bearing BL mounted in the Fe-alloy lower housing. As a consequence, the inner circumferential surface of the other half bearing BL is damaged.

In view of the above, an object of the present invention is to provide a bearing apparatus of a crankshaft for an internal combustion engine that is capable of supplying oil to a bearing gap quickly at an early stage when starting the internal combustion engine in a state of low temperature and reducing the amount of the oil to be supplied in the normal operation thereof.

SUMMARY OF THE INVENTION

In order to solve the above-identified problem, the present invention provides a bearing apparatus (1) of a crankshaft (3) for an internal combustion engine, which includes a crankshaft (3) having a plurality of journals (61, 62) and a plurality of crankpins (5), main bearings (41, 42) supporting the crankshaft (3), and a bearing housing (8) holding the main bearings (41, 42).

The plurality of journals include a first journal (61) and a second journal (62). The first journal (61) has a lubricating oil passage (63a) for delivering oil to the crankpins of the crankshaft whilst the second journal (62) does not have such a lubricating oil passage.

The first journal (61) is supported by a first main bearing (41). The first main bearing (41) is constituted by a pair of half bearings which include an upper half bearing (41U) and a lower half bearing (41L) each having a shape of a half cylinder.

The second journal (62) is supported by a second main bearing (42). The second main bearing (42) is constituted by a pair of half bearings which include an upper half bearing (42U) and a lower half bearing (42L) each having a shape of a half cylinder.

The bearing housing (8) is constituted by an upper housing (81) made of an aluminum (Al) alloy and a lower housing (82) made of an iron (Fe) alloy. The upper housing has a half-cylinder surfaces (83a) adapted to be brought into alignment with an outer circumferential surface of the upper half bearing. The lower housing has a half-cylinder surface (83b) adapted to be brought into alignment with an outer circumferential surface of the lower half bearing. The upper half bearings (41U, 42U) are configured to be held by the half-cylinder surfaces (83a) of the upper housing and the lower half bearings (41L, 42L) are configured to be held by the half-cylinder surfaces (83b) of the lower housing.

An internal oil passage (G2) for supplying oil to the first and second main bearings is formed inside of the upper housing, and an opening (G2c) of the internal oil passage (G2) is formed in the half-cylinder surface (83a) of the upper housing.

Only the upper half bearings (41U, 42U) out of the pairs of the half bearings respectively have an oil groove (41G, 42G) formed in an inner circumferential surface and at least one oil hole (45).

The oil holes (45) extend through respective walls of the upper half bearings (41U, 42U) in a direction of the thickness of the walls and open in respective outer circumferential surfaces of the upper half bearings (41U, 42U).

The opening (G2c) of the internal oil passage (G2) of the upper housing (81) and the oil groove (41G, 42G) are configured to be brought into communication with each other via the oil hole (45).

A crash relief (70) is formed in each of the upper and lower half bearings (41U, 41L, 42U, 42L) at each of both circumferential-direction ends of the inner circumferential surface.

The range of formation of the oil groove (41G) of the upper half bearing (41U) of the first main bearing (41) in the circumferential direction is defined such that each of both ends of the oil groove (41G) in the circumferential direction is in communication with the crash relief (70) at a minimum and opens in an edge face (72) in the circumferential direction of the upper half bearing (41U) at a maximum.

The oil groove (42G) of the upper half bearing (42U) of the second main bearing (42) is formed for an entire length of the upper half bearing (42U) in the circumferential direction, and each of both ends in the circumferential direction of the oil groove (42G) is configured to open in corresponding each of both edge faces (72) in the circumferential direction of the upper half bearing (42U).

When a region with a central angle of ±45° with reference to the central portion in the circumferential direction of the upper half bearings (41U, 42U) is defined as a ±45° region (θ1), a depth (D2) of the oil groove (42G) of the upper half bearing (42U) of the second main bearing (42) at least in the ±45° region (θ1) is equal to or smaller than a half of a depth (D1) of the oil groove (41G) of the upper half bearing (41U) of the first main bearing (41) in the ±45° region (θ1).

It should be noted that the terms "upper" and "lower" as used herein are not intended for delimiting the arrangement of the features of the present invention and the present invention can be arranged according to any appropriate orientation.

In accordance with another embodiment of the present invention, the depth (D2) of the oil groove (42G) of the upper half bearing (42U) of the second main bearing (42) is equal to or smaller than a half of the depth (D1) of the oil groove (41G) of the upper half bearing (41U) of the first main bearing (41) at a corresponding location in a circumferential direction over an entire length in the circumferential direction (at any location in the circumferential direction).

In accordance with another embodiment of the present invention, the depth (D2) of the oil groove (42G) of the upper half bearing (42U) of the second main bearing (42) is 0.5 mm at a maximum at least in the ±45° region (θ1).

In addition, in accordance with another embodiment of the present invention, the depth (D2) of the oil groove (42G) of the upper half bearing (42U) of the second main bearing (42) is minimum at an end in the circumferential direction on a rear side in the direction of rotation of the second journal (62) of the oil groove (42G) and increased toward an other end in the circumferential direction on a forward side in the direction of rotation of the second journal (62).

According to the present invention, the oil groove 42G of the upper half bearing 42U of the second main bearing 42 supporting the second journal 62 is configured to cover the ±45° region θ1 where change in the gap between the bottom surface of the oil groove 42G and the surface of the second journal 62 is large in the event of occurrence of a change in the temperature of the bearing apparatus 1 (bearing housing 8). Also, the depth D2 of the oil groove 42G of the upper half bearing 42U is defined, at least in the ±45° region θ1, to be equal to or smaller than a half of the depth D1 in the ±45° region θ1 of the oil groove 41G of the upper half bearing 41U of the first main bearing 41 supporting the first journal 61. As a result, when the internal combustion engine is to be started in a cold region in a state of low temperature (e.g., −30° C.), the gap between the bottom surface of the oil groove 42G of the upper half bearing 42U that supports the second journal 62 in the ±45° region θ1 and the surface of the second journal 62 becomes narrow, so that the oil in the oil groove 42G is strongly acted on by the force on the surface of the rotating journal 62, and the oil is forcibly delivered in the oil groove 42G to the forward side in the direction of axial rotation of the journal. In the meantime, the oil is sheared, the temperature of the oil rises quickly at an early stage, and the viscosity of the oil is lowered.

When the internal combustion engine is to be started in the state of low temperature, the bearing gap between the surface of the second journal 62 and the inner circumferential surface 71 of the second main bearing 42 is extremely narrow. However, the oil whose viscosity is lowered is allowed to be supplied quickly at an early stage from the oil groove 42G into the bearing gap between the inner circumferential surface 71 of the lower half bearing 42L accommodated in the Fe-alloy lower housing 82 and the surface of the second journal 62.

Meanwhile, when the internal combustion engine is normally operated and the temperature of the bearing apparatus 1 rises, the gap between the bottom surface of the oil groove 42G of the upper half bearing 42U and the surface of the second journal 62 is enlarged, so that the force due to the rotating journal is prevented from easily acting on the oil in the oil groove and the oil is prevented from easily and excessively flow from the oil groove 42G into the gap between the inner circumferential surface of the upper half bearing 42U and the surface of the second journal 62 and the gap between the inner circumferential surface of the lower half bearing 42L and the surface of the second journal 62. In addition, since the depth of the oil groove 42G of the upper half bearing 42U is configured to be equal to or smaller than a half of the depth of the oil groove 41G of the upper half bearing 41U of the first main bearing 41, the volume inside of the oil groove 42G is decreased. Since the amount of oil supply to the second main bearing 42 is small, it is made possible to achieve a smaller oil pump.

DETAILED DESCRIPTION OF THE INVENTION

First Embodiment

Figure 1:
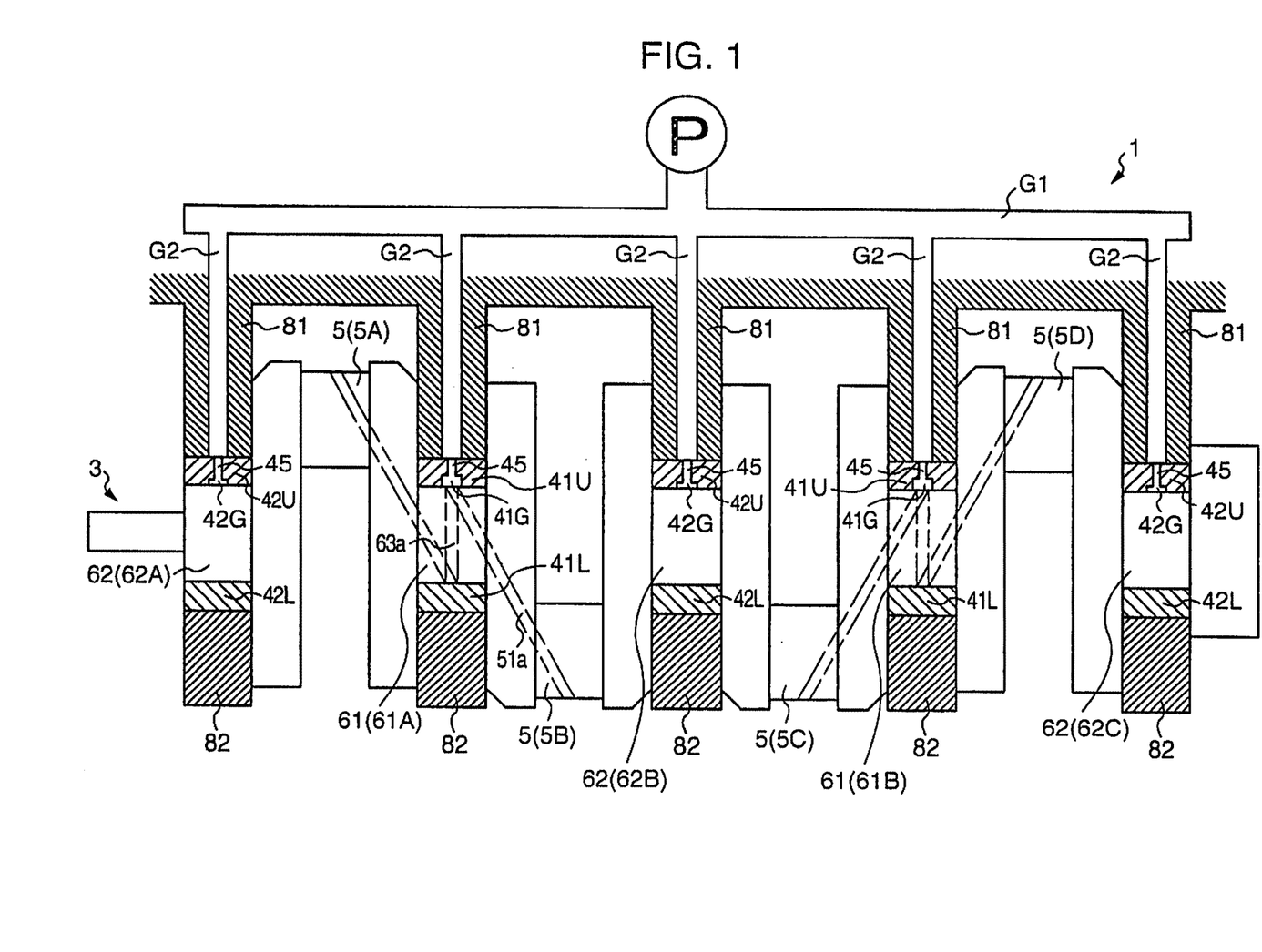
FIG. 1 is a schematic diagram illustrating a bearing apparatus of a crankshaft.
Figure 2:
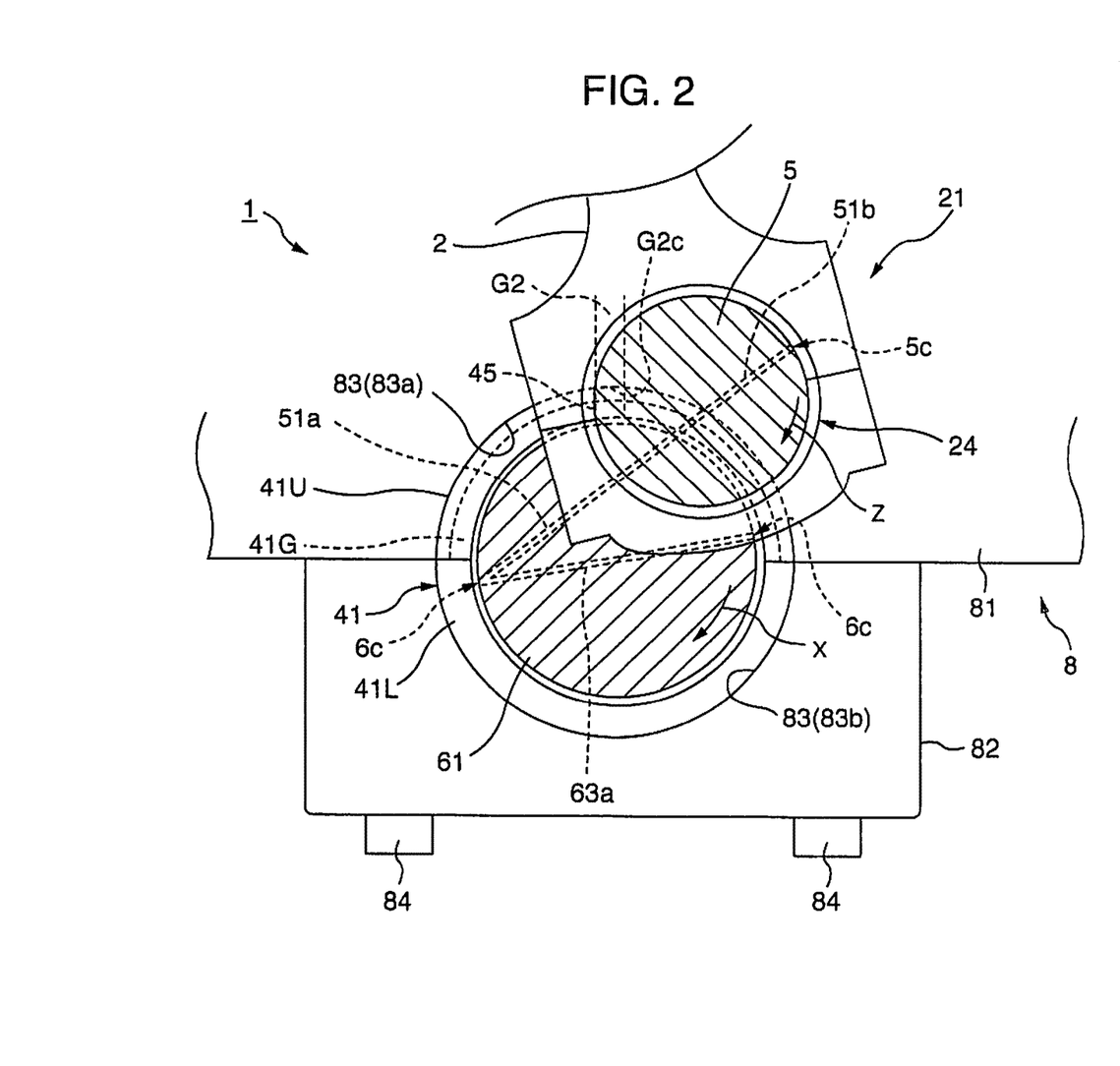
FIG. 2 is a front view of a first journal with a lubricating oil passage.
Figure 3:
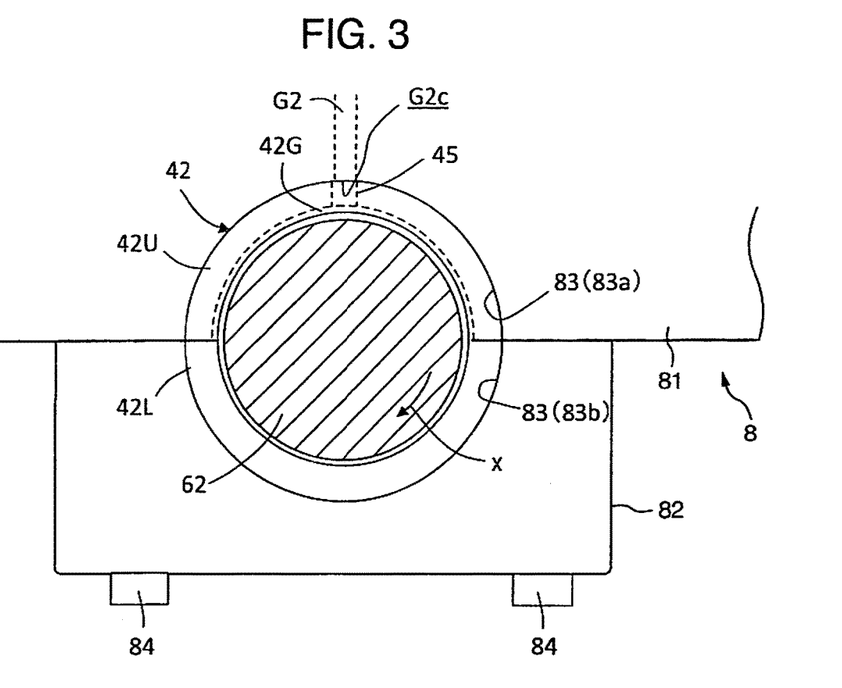
FIG. 3 is a front view of a second journal without a lubricating oil passage.

FIG. 1 is a schematic diagram that illustrates a bearing apparatus 1 of a crankshaft 3 in accordance with the present invention implemented in an in-line four-cylinder internal combustion engine. FIG. 2 illustrates a bearing structure of a journal 61 (which corresponds to second and fourth journals (61A and 61B) in FIG. 1) having a lubricating oil passage 63a for supplying oil to a crankpin 5 of the bearing apparatus 1 illustrated in FIG. 1 ("the journal with the lubricating oil passage" is hereinafter referred to as "first journal"). FIG. 3 illustrates a bearing structure of a journal 62 (which corresponds to first, third, and fifth journals (62A, 62B, and 62C) in FIG. 1) that does not have a lubricating oil passage for supplying oil to the crankpin 5 of the bearing apparatus 1 illustrated in FIG. 1 ("the journal without a lubricating oil passage" is hereinafter referred to as "second journal").

Basic Configuration of the Bearing Apparatus

As illustrated in FIG. 1, the bearing apparatus 1 in accordance with this embodiment includes a set of journals 6 (61A, 61B, 62A, 62B, and 62C) that are arranged at five locations and supported by a cylinder block; and the crankshaft 3 having crankpins (5A to 5D) that are arranged at four locations. The crankpins 5 are formed in one piece with the journals 6 such that each crankpin 5 is positioned between a pair of the journals 6, and configured to rotate about the journal 6. In addition, the bearing apparatus 1 further includes five main bearings 4 each configured to rotatably support a corresponding one of the journals 6 (61A, 61B, 62A, 62B, and 62C) as a plain bearing that supports the crankshaft 3; and four connecting rods 21 and connecting rod bearings 24 (not shown in FIG. 1) rotatably supporting the crankpins 5 (5A to 5D). The crankshaft 3 in a small internal combustion engine for an automobile is made of an iron (Fe) alloy, and the diameter of the journal 6 is in the order of 40 mm to 100 mm. The multiple journals 6 basically have the same diameter.

The first main bearing 41 that supports the first journal 61 is constituted by a pair of half bearings (an upper half bearing 41U and a lower half bearing 41L). The second main bearing 42 that supports the second journal 62 is constituted by a pair of half bearings (i.e., an upper half bearing 42U and a lower half bearing 42L). The half bearings are formed by a backing metal layer made of an iron (Fe) alloy and a bearing alloy (aluminum (Al) alloy, copper (Cu) alloy, etc.) layer. The bore diameters of the main bearings 41 and 42 are defined to correspond to the diameter of the journal. The wall thickness of the main bearings 41 and 42 are in the order of 1.5 mm to 3.0 mm.

In the Al-alloy cylinder block, bearing housings 8 are provided at respective locations corresponding to the respective journals 6. The bearing housing 8 is constituted by an upper housing 81 and a lower housing 82. The upper housing 81 is made of an aluminum alloy and is part of the cylinder block. The lower housing 82 is a bearing cap made of an iron alloy. The upper housing 81 and the lower housing 82 have half-cylinder surfaces 83a and 83b, respectively, which are adapted to be brought into alignment with the half bearings 41U, 41L, 42U, and 42L. The upper housing 81 and the lower housing 82 are configured such that a cylindrical bearing holding hole 83 is formed when these two housings are fixed to each other by a bolt or bolts 84 and thus integrated. The cylindrical main bearings 41 and 42 are held in the bearing holding hole 83.

Oil that has been discharged by an oil pump P is delivered to an oil gallery G1 formed in the cylinder block wall and then to five internal oil passages G2 branching from the oil gallery G1. The internal oil passage G2 opens in a half-cylinder surface 83a of the upper housing 81. The oil that flows out of an opening G2c of the internal oil passage G2 is supplied via the oil hole 45 formed in and through the wall of the main bearings 41 and 42 into the oil grooves 41G and 42G formed in the inner circumferential surfaces of the main bearings 41 and 42, respectively.

FIG. 1 illustrates the bearing apparatus 1 of the crankshaft 3 of the four-cylinder internal combustion engine. As illustrated in FIG. 1, the numbers "1" to "5" are assigned to the journals 6 provided at the five locations of the crankshaft 3, respectively, from the front (Fr) side to the rear (Rr) side, and the numbers "1" to "4" are assigned to the crankpins 5 provided at the four locations from the front (Fr) side to the rear (Rr) side. A first lubricating oil passage 63a is formed through the second and fourth journals 61A and 61B, respectively, so as to extend in a direction parallel to the diameter of the journals. Further, two second lubricating oil passages 51a branching from the first lubricating oil passage 63a and extending through a crank arm are formed in the second and fourth journals 61A and 61B, respectively. The second lubricating oil passage 51a is in communication with a third lubricating oil passage 51b formed through the first to fourth crankpins 5A to 5D in a direction parallel to their diameters. No lubricating oil passage is formed in the first, third, and fifth journals 62A, 62B, and 62C inside thereof. It should be noted that the configuration of the crankshaft 3 is not limited to that illustrated in FIG. 1 as long as the crankshaft 3 has multiple journals 6 and at least one of the journals does not include therein the lubricating oil passage 63a.

In FIG. 2, with regard to the positional relationships in the depth direction of the figure, it will be appreciated that the first journal 61 resides on the far side whilst the crankpin 5 resides on the near side.

The first journal 61 is supported by the Al-alloy cylinder block of the internal combustion engine via the first main bearing 41. The first main bearing 41 is constituted by a pair of half bearings, i.e., the upper half bearing 41U and the lower half bearing 41L. The oil groove 41G is formed in the inner circumferential surface of the upper half bearing 41U for the entire length of the circumferential direction. In addition, the first journal 61 has the lubricating oil passage 63a extending therethrough in the direction parallel to its diameter. When the first journal 61 rotates in the direction indicated by an arrow X, then the openings 6c at both ends of the lubricating oil passage 63a are alternately brought into communication with the oil groove 41G of the first main bearing 41.

The crankpin 5 is supported by a big-end housing 21 of the connecting rod 2 via a connecting rod bearing 24 constituted by a pair of half bearings.

As described above, with regard to the first main bearing 41, the lubricating oil discharged by the oil pump P is delivered from the internal oil passage G2 formed in the cylinder block wall, via an oil hole 45 formed through the wall of the upper half bearing 41U, and thus into the inside of the oil groove 41G formed in the inner circumferential surface of the upper half bearing 41U for the entire length thereof of the circumferential direction.

Further, the first lubricating oil passage 63a is formed through the first journal 61 in the direction parallel to its diameter, and the openings 6c at both ends of the first lubricating oil passage 63a are adapted to be brought into communication with the lubricating oil groove 41G. In addition, the second lubricating oil passage 51a is formed which branches from the first lubricating oil passage 63a of the first journal 61 and extends through the crank arm (not shown), and the third lubricating oil passage 51b is formed through the crankpin 5 in the direction parallel to its diameter.

In accordance with this construction and arrangement, the oil flows through the first lubricating oil passage 63a and the second lubricating oil passage 51a and is supplied via an outlet 5c at the end of the third lubricating oil passage 51b into a gap created between the crankpin 5 and the connecting rod bearing 24.

As illustrated in FIG. 3, the second journal 62 is supported by the Al-alloy cylinder block of the internal combustion engine via the second main bearing 42. The second main bearing 42 is constituted by a pair of half bearings, i.e., the upper half bearing 42U and the lower half bearing 42L. The oil groove 42G is formed in the inner circumferential surface of the upper half bearing 42U for the entire length thereof in the circumferential direction.

As described above, with regard to the second main bearing 42, the lubricating oil discharged by the oil pump P is delivered from the internal oil passage G2 formed in the cylinder block wall, via the oil hole 45 formed through the wall of the upper half bearing 42U, and thus into the inside of the oil groove 42G formed in the inner circumferential surface of the upper half bearing 42U.

Figure 4:
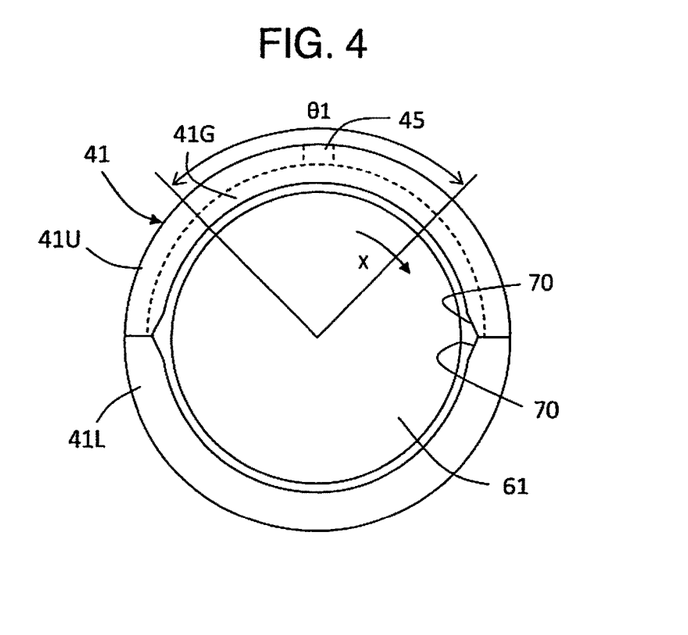
FIG. 4 is a front view of a first main bearing 41 illustrated in FIG. 2.
Figure 5:
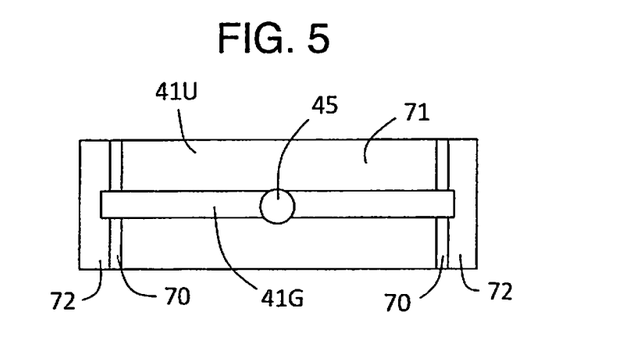
FIG. 5 is a diagram illustrating an inner circumferential surface of an upper half bearing 41U illustrated in FIG. 4.

FIG. 4 is a front view of the first main bearing 41 that supports the first journal 61 illustrated in FIG. 2. FIG. 5 illustrates an inner surface of the upper half bearing 41U.

A crash relief 70 is formed at a region adjacent to the respective edge faces 72 of the upper and lower half bearings 41U and 41L in the circumferential direction. The crash relief 70 is a region with a reduced wall thickness formed such that the thickness of the wall is decreased relative to that of the original inner circumferential surface 71 (main arc). The crash relief 70 is provided and intended for forming a crash relief gap 70c for absorbing positional deviation and deformation of an abutment edge face (the edge face 72 in the circumferential direction) in the state where the pair of half bearings 41U, 41L are mounted to the bearing housing 8 (for example, see SAE J506 (item 3.26 and item 6.4), DIN1497 (section 3.2), and JIS D3102). In general, in the case of bearings for small internal combustion engines for automobiles, the depth of the crash relief (the distance from the virtually-extended original inner circumferential surface to the actual inner circumferential surface) of the edge face of the half bearing in the circumferential direction is in the order of 0.01 to 0.075 mm, and the length of the crash relief (the length in the vertical direction from the edge face of the half bearing in the circumferential direction up to the upper end of the crash relief 70 with respect to the edge face) is in the order of 3 to 7 mm. It should be noted that the same crash relief 70 as those of the upper and lower half bearings 41U, 41L are also formed in the upper and lower half bearings 42U and 42L, respectively, by which the second main bearing 42 is configured.

According to the first embodiment, the upper half bearing 41U has the oil groove 41G in its circumferential surface for the entire length thereof in the circumferential direction. In the first embodiment, the depth D1 of the oil groove 41G and the length of the oil groove 41G in the axis direction (the width of the oil groove 41G) are defined such that the oil groove 41G has substantially uniform dimensions for the entire upper half bearing 41U in the circumferential direction. When the diameter of the journal of the crankshaft 3 for a small internal combustion engine is in the order of 40 to 100 mm, then the depth D1 of the oil groove 41G will be in the order of 1 mm to 2.5 mm. A larger diameter of the journal will lead to a larger depth D1 of the oil groove 41G.

In addition, the oil hole 45 is formed in the oil groove 41G which extends through the wall of the upper half bearing 41U. In this embodiment, one oil hole 45 is formed at the center position of the upper half bearing 41U in the circumferential direction which is also the center position in the axis direction. The diameter of the opening 6c of the lubricating oil passage 63a in the surface of the first journal 61 is typically in the order of 3 to 8 mm, and the length of the oil groove 41G in the axis direction are defined such that it is slightly larger than the diameter of the opening 6c of the lubricating oil passage 63a. In addition, when the opening of the oil hole 45 is circular in shape as in the first embodiment, then the diameter of the opening is defined such that it is slightly larger than the length of the oil groove 41G in the axis direction.

Since the oil groove 41G is formed for the entire length of the inner circumferential surface, either of the two openings 6c of the lubricating oil passage 63a is brought into communication with the oil groove 41G, so that it is made possible to always supply the oil to the crankpin 5.

It should be noted that, in contrast to this embodiment, the oil groove 41G may be modified such that both ends of the oil groove 41G in the circumferential direction are positioned at the crash relief 70. Alternatively, one end of the oil groove 41G in the circumferential direction may be positioned at the crash relief whilst the other end in the circumferential direction may be positioned at the edge face 72 of the upper half bearing 41U in the circumferential direction. In addition, the oil groove 41G may be defined such that the length of the oil groove in the axis direction becomes maximum at or near the center of the oil groove 41G in the circumferential direction and gradually decreases toward both ends of the oil groove 41G in the circumferential direction. In addition, the depth D1 of the oil groove 41G may be defined such that it becomes maximum at the center of the oil groove 41G in the circumferential direction and gradually decrease toward both ends of the oil groove 41G in the circumferential direction. In addition, the depth D1 of the oil groove 41G may be defined such that it becomes maximum at the one end of the oil groove 41G in the circumferential direction and gradually decrease toward to other end in the circumferential direction.

The lower half bearing 41L have the same shape and dimensions as those of the upper half bearing 41U apart from the fact that it does not have the features of the oil groove 41G and the oil hole 45.

Figure 6:
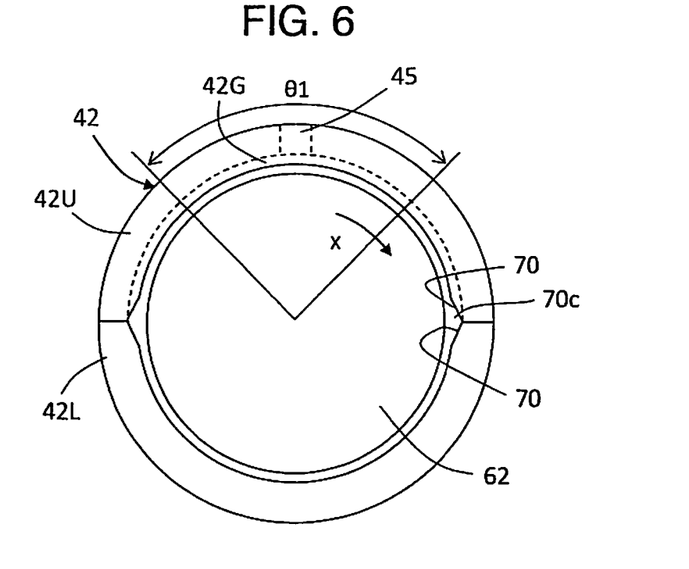
FIG. 6 is a front view of a second main bearing 42 illustrated in FIG. 2.
Figure 7:
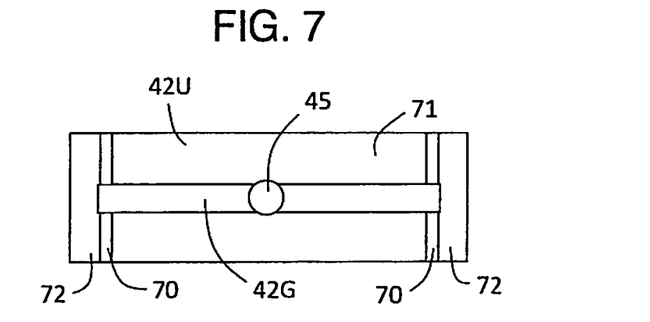
FIG. 7 is a diagram illustrating an inner circumferential surface side of an upper half bearing 42U illustrated in FIG. 6.

In addition, according to the bearing apparatus 1 illustrated in FIG. 1, the main bearings 41 of the second and fourth journals 61A and 61B have the same shape and dimensions. FIG. 6 is a front view of the second main bearing 42 that supports the second journal 62 illustrated in FIG. 3. FIG. 7 illustrates an inner surface of the upper half bearing 42U.

The second main bearing 42 is constituted by a pair of half bearings, i.e., the upper half bearing 42U and the lower half bearing 42L. The upper half bearing 42U and the lower half bearing 42L are formed in the shape of a half cylinder having the same bearing bore diameter, the same bearing outside diameter, and the same bearing width as those of the pair of the upper and lower half bearings 41U, 41L. In addition, their crash reliefs 70 have the same dimensions as those of the upper and lower half bearings 41U, 41L. In addition, an oil hole 45 identical to that of the upper half bearing 41U is formed in the upper half bearing 42U.

The oil groove 42G is formed in the inner circumferential surface of the upper half bearing 42U for the entire length in the circumferential direction. The depth of the oil groove 42G and the length of the groove in the axis direction (width of the groove) are defined to be uniform.

The range of formation of the oil groove 42G covers a region θ1 with a central angle of ±45° (hereinafter referred to as "±45° region θ1") with reference to the central portion of the upper half bearing 42U in the circumferential direction. The ±45° region θ1 is, as will be described later, a region where the change in the gap between the surface of the second journal 62 and the bottom surface (inner surface) of the oil groove 42G becomes large when change in temperature occurs in the bearing apparatus 1 (bearing housing 8).

Figure 8:
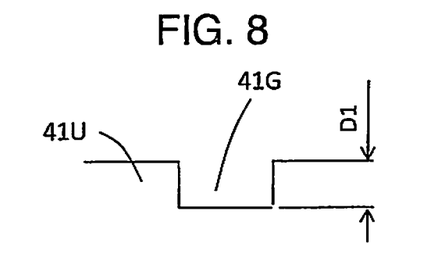
FIG. 8 is a cross-sectional view of an oil groove 41G of the upper half bearing 41U.

In addition, the depth D2 of the oil groove 42G (see FIG. 9) of the upper half bearing 42U of the second main bearing 42 is defined to be equal to or less than a half of the depth D1 of the oil groove 41G (see FIG. 8) of the upper half bearing 41U of the first main bearing 41. For example, if the depth D1 of the oil groove 41G is 1.0 mm, then the depth D2 of the oil groove 42G is defined to be equal to or less than 0.5 mm. It should be noted in the context of the first embodiment that, as illustrated in FIGS. 4 and 6, the above-described relationship between the depth D2 of the oil groove 42G and the depth D1 of the oil groove 41G is realized for the entire length of the oil groove 42G in the circumferential direction of the upper half bearing 42U. Nevertheless, the relationship is not limited to this and it suffices that the above relationship between the oil groove 42G and the oil groove 41G is realized at least in the ±45° region θ1. It should be noted that the depth D2 of the oil groove 42G refers to the distance between the inner circumferential surface 71 of the upper half bearing 42U and the bottom surface of the oil groove, whilst the depth D2 of the oil groove 42G at the crash relief 70 of the upper half bearing 42U denotes the distance between a virtual inner circumferential surface (created virtually by extending the inner circumferential surface 71 to the crash relief 70) and the groove bottom surface.

The width of the oil groove 42G according to this embodiment is defined to be identical to the width of the oil groove 41G. The width of the oil groove 42G is not limited to this and may be defined to be smaller or larger than the width of the oil groove 41G. In addition, the width of the oil groove 42G may be defined to vary in the circumferential direction.

The maximum depth of the depth D2 of the oil groove 42G in the ±45° region θ1 is preferably equal to or larger than 0.1 mm. In addition, even when the depth D1 of the oil groove 42G exceeds 1.0 mm, the depth of the oil groove 42G is preferably defined to be equal to or less than 0.5 mm. The reason for this is that, as will be described later, this condition is suitable for shearing of the oil within the oil groove 42G at low temperature and the volume inside of the groove can be reduced, which in turn reduces the amount of oil to be supplied in normal operation.

In addition, according to the bearing apparatus 1 illustrated in FIG. 1, the second main bearings 42 that are used for the first, third, and fifth journals 62A, 62B, and 62C without a lubricating oil passage have the same shape and dimensions. In addition, the second main bearings 42 that are used therefor have the same outside diameter, the same bore diameter, and the same bearing width (the length in the axis direction) as those of the first main bearings 41 of the second and fourth journals 61A and 61B. It should be noted that the respective main bearings 41 and 42 may be configured as a main bearing having different size and dimensions including different outside diameters, different bore diameters, and different bearing widths for the respective journals.

The following describes the bearing housing constituted by the Al-alloy upper housing and the Fe-alloy lower housing. The upper housing 81 and the lower housing 82 of the bearing housing 8 are processed at a room temperature (e.g., about 20° C.) in a state where they are secured to each other by Fe-alloy bolts 84, and a bearing holding hole 83 having a cylindrical shape (see FIG. 10A) for holding the main bearing 4 is formed therein. Subsequently, the bolt 84 is loosened, and the upper half bearings 41U and 42U and the lower half bearings 41L and 42L are arranged in the half-cylinder surfaces 83a and 83b of the upper housing 81 and the lower housing 82, respectively. In addition, the journal 6 of the crankshaft is installed in the bore diameter portion of the upper half bearings 41U and 42U and the lower half bearings 41L and 42L. Subsequently, the upper housing 81 and the lower housing 82 are again secured to each other by the bolt and the main bearings 41 and 42 are held in the bearing holding hole 83 of the bearing housing 8.

Figure 10A:
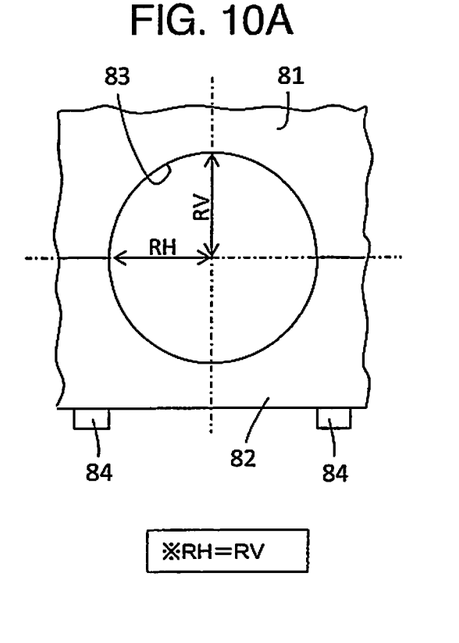
FIG. 10A is a diagram illustrating a change in a bearing holding hole 83 of a bearing housing 8.
Figure 10B:
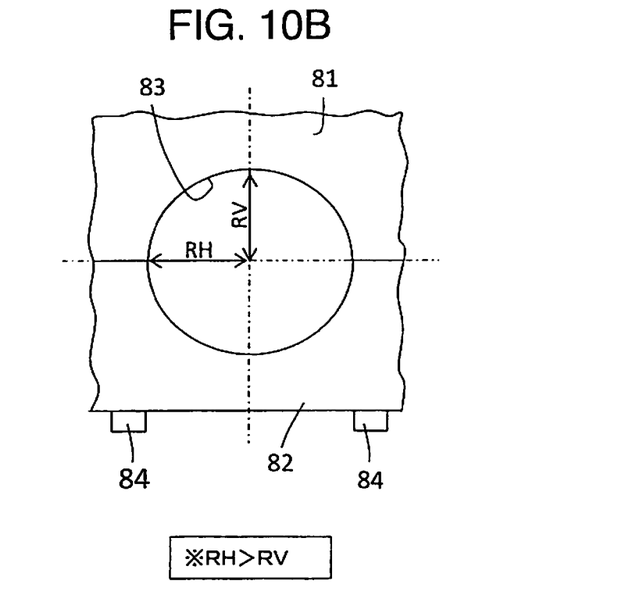
FIG. 10B is a diagram illustrating change in the bearing holding hole 83 of the bearing housing 8.
Figure 10C:
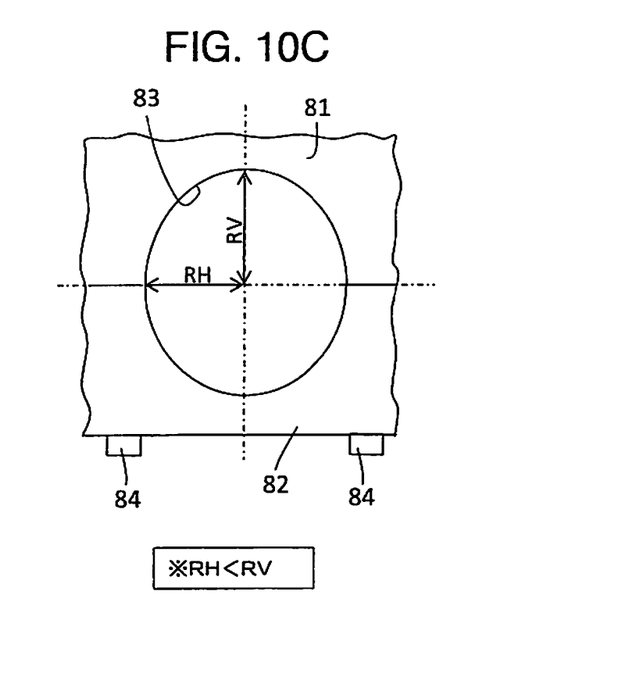
FIG. 10C is a diagram illustrating change in the bearing holding hole 83 of the bearing housing 8.

When the temperature changes, the upper housing 81 and the lower housing 82 exhibit different amounts of expansive deformation or amounts of contractive deformation due to difference in their thermal expansion rates. FIGS. 10A to 10C illustrate deformation of the bearing holding hole 83 of the bearing housing 8 when the temperature changes.

FIG. 10A illustrates the bearing holding hole 83 of the bearing housing 8 in a case where the bearing apparatus is at the temperature of about 20° C. With regard to the half-cylinder surface of the Al-alloy upper housing 81, the bore diameter RH in the direction parallel to the abutment edge face of the upper housing and the bore diameter RV in the vertical direction with respect to the abutment edge face take one and the same value.

FIG. 10B illustrates a bearing holding hole 83 of the bearing housing 8 in a case where the bearing apparatus 1 is assumed to be at the temperature of −30° C. in a cold region. With regard to the half-cylinder surface 83a of the upper housing 81, the bore diameter RV in the vertical direction with respect to the abutment edge face becomes smaller than the radius RH in the direction parallel to the abutment edge face of the upper housing 81.

The reason for this is as follows. When the bearing housing 8 is contractively deformed in response to the temperature change from about 20° C. (FIG. 10A) to −30° C. (FIG. 10B), the amount of contractive deformation of upper housing 81 is larger than the amount of contractive deformation of the lower housing 82. The Al-alloy housing and the Fe-alloy housing having different thermal expansion rate relative to each other are secured to each other by a bolt, and a compressive stress in the vertical direction with respect to the abutment edge face is generated near the abutment edge face of each housing. The abutment edge face of the Fe-alloy lower housing 82 whose thermal expansion rate is relatively low serves as resistance to the contractive deformation near the abutment edge face of the Al-alloy upper housing 81 whose thermal expansion rate is relatively high. As a result, the thermal contraction of the upper housing 81 is suppressed near the abutment surface with respect to the lower housing 82, but the amount of thermal contraction in the region with the central angle of ±45° with reference to the central portion in the circumferential direction of the half-cylinder surface 83a of the upper housing 81 (this region is not affected by the compressive stress due to tightening of the bolt) becomes large to the extent equivalent to the amount of reduction in the thermal contraction near the abutment edge face.

FIG. 10C illustrates the bearing holding hole 83 of the bearing housing 8 in a case where the bearing apparatus 1 is assumed to be at the temperature of 120° C. while the internal combustion engine is in normal operation. With regard to the half-cylinder surface of the Al-alloy upper housing 81, the bore diameter RV in the vertical direction with respect to the abutment edge face of the upper housing becomes larger than the bore diameter RH in the direction parallel to the abutment edge face of the upper housing.

When the bearing housing 8 is at the temperature of 120° C. (as a result of the rise in the temperature due to operation of the internal combustion engine), then the abutment edge face of the Fe-alloy lower housing 82 whose thermal expansion rate is relatively low serves as resistance to the thermal expansive deformation near the abutment edge face of the Al-alloy upper housing 81 whose thermal expansion rate is relatively high. As a result, the thermal expansion of the upper housing 81 is suppressed near the abutment surface with respect to the lower housing 82, but the amount of thermal expansion in the region with the central angle of ±45° with reference to the central portion in the circumferential direction of the half-cylinder surface 83a of the upper housing 81 (this region is not affected by the compressive stress due to tightening of the bolt) becomes large to the extent equivalent to the amount of reduction in the thermal expansion near the abutment surface.

When the pair of the upper and lower half bearings 42U and 42L and the second journal 62 are mounted to the bearing housing 8 illustrated in FIGS. 10A to 10C, it can be understood that the range of formation of the oil groove 42G of the upper half bearing 42U covers the region where the amount of change in the bore diameter of the bearing holding hole of the bearing housing 8, in particular, the radius of the half-cylinder surface 83a of the upper housing 81 becomes the largest. When change in the temperature of the bearing housing 8 occurs, the amount of change in the gap between the bottom surface (inner circumference) of the oil groove 42G and the surface of the second journal 62 becomes large in this range of formation of the oil groove 42G.

According to the bearing apparatus 1 in accordance with this embodiment, the oil groove 42G is formed such that the oil groove 42G includes the ±45° region θ1 where the amount of change in the gap between the bottom surface (inner circumference) of the oil groove 42G and the surface of the journal 62 becomes large when change in the temperature of the bearing housing 8 occurs. The depth D2 of the oil groove 42G at least in the ±45° region θ1 is defined to be equal to or smaller than a half of the depth D1 of the oil groove 41G at the corresponding position in the circumferential direction, and the gap between the bottom surface (inner surface) of the oil groove 42G and the surface of the second journal 62 is defined to be small.

When the internal combustion engine is placed in a state of low temperature (e.g., −30° C.), the bearing gap between the inner circumferential surface of the second main bearing 42 and the surface of the second journal 62 becomes extremely small due to the difference in the thermal expansion rates between the upper housing 81 and the second journal 62 of the Fe-alloy crankshaft 3. For a while after start of the operation of the internal combustion engine, the oil supplied from the outside into the inside of the oil groove 42G is in a state of low temperature and high viscosity. When the viscosity of the oil supplied into the inside of the oil groove 42G is high, the oil cannot easily flow from the oil groove 42G into the bearing gap, and, in particular, cannot be easily supplied into the bearing gap between the inner circumferential surface of the lower half bearing 42L and the surface of the second journal 62.

The second main bearing 42 of the bearing apparatus 1 in accordance with this embodiment is designed such that the gap between the bottom surface of the oil groove 42G and the surface of second journal 62 at least in the ±45° region θ1 becomes sufficiently small even when the oil supplied from the outside into the oil groove 42G is in the state of low temperature and high viscosity. As a result, when the operation of the internal combustion engine is started, the full amount of the oil in the oil groove 42G including the portion of the oil on the side of the bottom surface of the oil groove 42G is strongly acted upon by the force from the surface of the rotating journal 62, and the oil is forcibly delivered to the forward side in the direction of rotation of the journal. In the meantime, a sufficient shear force is applied to the oil, the temperature of the oil rises quickly at an early stage, and the viscosity of the oil is lowered. Further, the oil groove 42G of the upper half bearing 42U is formed for the entire length of the inner circumferential surface 71 in the circumferential direction, and both ends of the oil groove 42G in the circumferential direction open in both edge faces 72 in the circumferential direction of the upper half bearing 42U. As a result, the oil whose viscosity has become low directly flows from the end of the oil groove 42G in the circumferential direction into the bearing gap between the inner circumferential surface of the lower half bearing 42L and the surface of the journal 62.

If both ends in the circumferential direction of the oil groove 42G are defined such that they are positioned (they open) in the proximal side with respect to both edge faces 72 in the circumferential direction of the upper half bearing 42U (which is out of the coverage by the present invention), then the amount of oil that flows out of the end of the oil groove 42G in the circumferential direction is decreased. Further, the oil may be discharged via the gap between the surface of the journal 62 and the inner circumferential surface 71 of the upper half bearing 42U and the gap between the surface of the crash relief 70 and the surface of the journal 62 from the end of the upper half bearing 42U in the axis direction to the outside before the oil that flows out reaches the edge face 72 in the circumferential direction of the half bearing 42U. Accordingly, the oil supply to the inner circumferential surface of the lower half bearing 42L is delayed, and, in addition, the amount of oil supply is also decreased.

Figure 9:
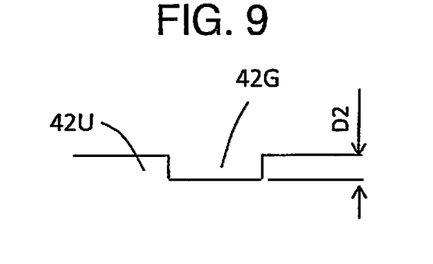
FIG. 9 is a cross-sectional view of an oil groove 42G of the upper half bearing 42U.

It should be noted that the oil groove 42G, as illustrated in FIG. 9, preferably has a flat bottom surface in the cross section of the oil groove 42G so as to be parallel to the surface of the second journal 62. This is because a sufficient shear force is allowed to be applied to the oil. The cross-sectional shape of the oil groove 42G is not limited to the rectangular cross-sectional shape illustrated in FIG. 9, and it may be modified into an inverted trapezoidal cross-sectional shape, an arc-like cross-sectional shape, and the like.

The reason why the depth D2 of the oil groove 42G is defined to be equal to or smaller than a half of the depth D1 of the oil groove 41G is as follows. The bearing apparatus 1 of the present invention is a bearing apparatus optimized for a small internal combustion engine of an automobile. For example, when the diameter of the journal of the crankshaft is 40 to 100 mm, the depth D1 of the oil groove 41G will be 1 to 2.5 mm, and the depth D1 of the oil groove 41G will be made larger in accordance with the size of the diameter of the journal. For example, when the depth D1 of the oil groove 41G is 2.5 mm, the depth D2 of the oil groove 42G may be up to 1.25 mm, but in this case, since the diameter of the journal 62 is made large, the force on the surface of the rotating journal also becomes large. As a result, the oil in the oil groove 42G at a low temperature is sufficiently sheared, the temperature of the oil rises at an early stage, and the viscosity of the oil can be decreased.

In addition, according to the present invention, since the groove depth D2 is defined to be equal to or smaller than a half of the depth D1 of the oil groove 41G, the volume inside of the oil groove 42G is defined to be small. Since the amount of oil supplied to the second main bearing 42 can be decreased while the normal operation of the internal combustion engine, it is made possible to reduce the amount of oil to be supplied to the entire bearing apparatus 1.

In addition, when the oil depth D2 of the oil groove 42G is defined to be larger than a half of the depth D1 of the oil groove 41G, it becomes hard for the oil in the oil groove to be sheared immediately after starting of the internal combustion engine at a low temperature, the temperature of the oil does not rise at an early stage, and the viscosity of the oil is hard to be decreased. In addition, since the volume inside of the oil groove becomes large, the amount of oil to be supplied in the normal operation is increased.

In addition, when the configuration of a pair of Fe-alloy upper and lower housings is adopted for the bearing housing 8, or when the configuration of a pair of Al-alloy upper and lower housings is adopted therefor, the thermal expansive deformation as illustrated in FIGS. 10A to 10C of the bearing holding hole of the bearing housing does not occur, and the effects of the present invention will not be able to be achieved.

Second Embodiment

Figure 11:
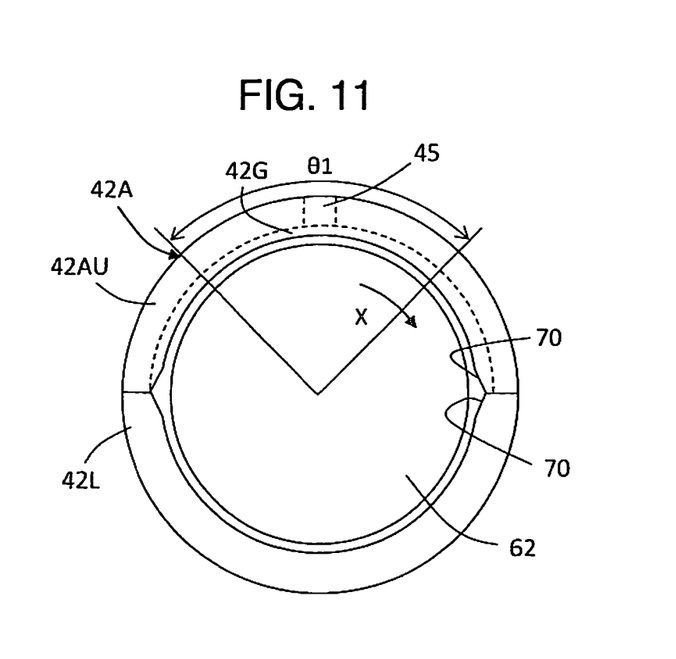
FIG. 11 is a front view of a second main bearing 42A in accordance with a second embodiment.
Figure 12:
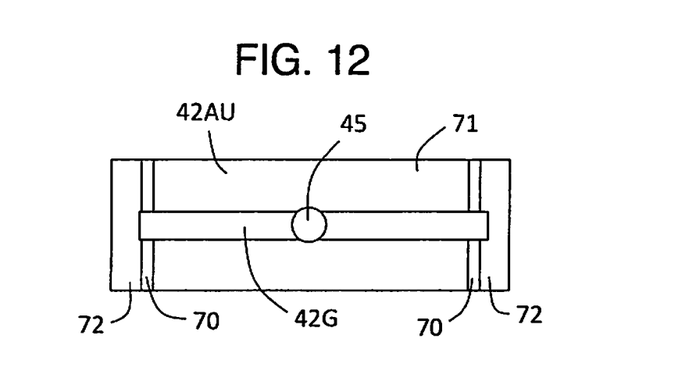
FIG. 12 is a bottom view of an upper half bearing 41AU illustrated in FIG. 11.

The following describes the second main bearing 42A that supports the second journal 62 in accordance with a second embodiment with reference to FIGS. 11 and 12. The second main bearing 42A of this embodiment includes an upper half bearing 42AU whose shape is different than that in the first embodiment. In the following explanations, the elements identical or equivalent to those in the first embodiment are indicated by the same reference signs as in the first embodiment.

Configuration

The configuration is described first. The configuration of the first main bearing 41 that supports the first journal 61 in accordance with this embodiment is identical to that in the first embodiment. The configuration of the second main bearing 42A is substantially identical to that in the first embodiment apart from the shape of the oil groove 42G of the upper half bearing 42AU.

Specifically, the depth D2 of the oil groove 42G in accordance with this embodiment is configured, as illustrated in FIG. 11, such that the depth D2 becomes minimum at the circumferential direction edge face 72 of the rear side of the direction of rotation of the journal 62 of the crankshaft of the oil groove 42G and gradually increases toward the forward side in the direction of rotation of the journal 62 of the crankshaft.

If the depth D2 of the oil groove 42G changes in the circumferential direction as in the second embodiment, it suffices that the depth D2 of the oil groove 42G of the upper half bearing 42AU at least in the ±45° region is defined to be equal to or smaller than a half of the depth D1 of the oil groove 41G in the ±45° region θ1. Further, the depth D2 of the oil groove 42G is preferably defined to be equal to or smaller than a half of the depth D1 of the oil groove 41G of the upper half bearing 41U at the corresponding location in the circumferential direction for the entire length in the circumferential direction (i.e., at any location in the circumferential direction).

(Operation)

When the internal combustion engine is started at a low temperature, the oil whose viscosity became low in the oil groove 42G in the ±45° region θ1 of the upper half bearing 42AU flows toward the circumferential-direction end on the forward side of the direction of rotation (the direction indicated by an arrow X of FIG. 11) of the second journal 62 of the oil groove 42G. Meanwhile, if the depth D2 of the oil groove 42G is defined to be gradually increased toward the circumferential-direction end on the forward side of the direction of rotation of the journal 62, the resistance to flow with regard to the oil flowing in the oil groove 42G becomes small compared with a case where the depth D2 of the oil groove 42G is uniform in the circumferential direction or a case where the depth D2 of the oil groove 42G is decreased towards the circumferential-direction end on the forward side of the direction of rotation of the journal 62. As a result, the oil supply from the oil groove 42G of the upper half bearing 42AU to the inner circumferential surface of the lower half bearing 42L takes place quickly at an early stage and, in addition, the amount of oil supply is also increased.

Third Embodiment

Figure 13:
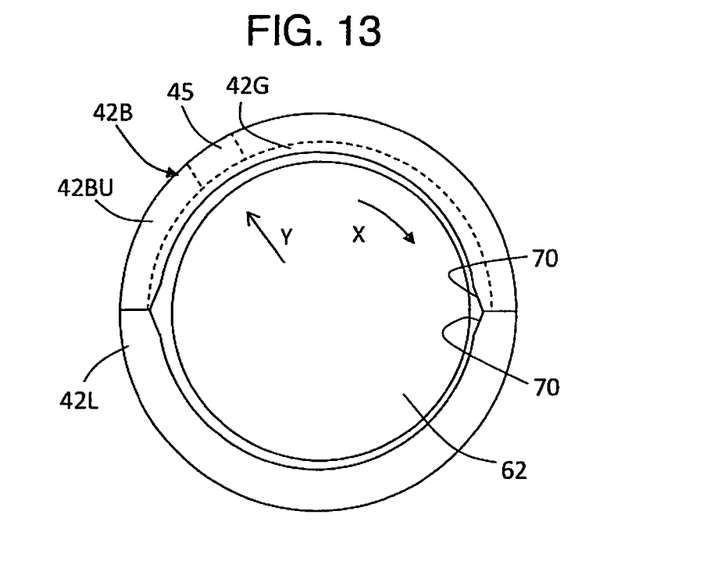
FIG. 13 is a front view of a second main bearing 42B in accordance with a third embodiment.
Figure 14:
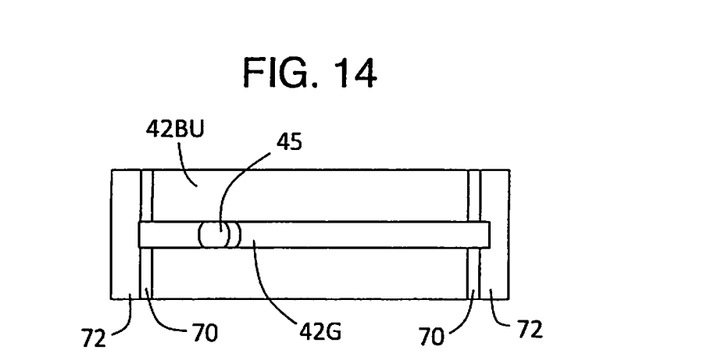
FIG. 14 is a bottom view of an upper half bearing 42BU illustrated in FIG. 13.
Figure 15:
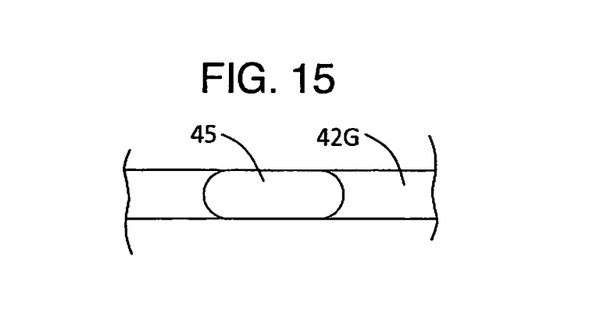
FIG. 15 is a view of an oil hole 45 illustrated in FIG. 13 viewed in the direction indicated by an arrow Y in FIG. 13.

The following describes the second main bearing 42B that supports the second journal 62 in accordance with a third embodiment with reference to FIGS. 13, 14, and 15. The second main bearing 42B in accordance with this embodiment includes an upper half bearing 42BU whose shape is different than those in the first and second embodiments. In the following explanations, the elements identical or equivalent to those in the first embodiment are indicated by the same reference signs as in the first embodiment.

(Configuration)

The configuration is described first. The configuration of the first main bearing 41 that supports the first journal 61 in accordance with this embodiment is identical to that in the first embodiment. The configuration of the second main bearing 42B is substantially identical to those in the first and second embodiments apart from the location and the shape of the oil hole 45 of the upper half bearing 42BU.

Specifically, the oil hole 45 in accordance with this embodiment is configured such that the oil hole 45 is positioned on the rear side of the direction of rotation of the second journal 62 relative to the location of the central portion of the upper half bearing 42BU in the circumferential direction.

(Operation)

The half bearing 42BU has a configuration according to which the oil hole 45 is positioned on the rear side of the direction of rotation of the journal relative to the position of the center of the circumferential-direction length of the oil groove 42G, and the oil introduced from the oil hole 45 into the oil groove 42G is allowed to readily flow in the oil groove 42G toward the forward side of the direction of rotation of the journal 62. Further, the bottom surface of the oil groove 42G is formed at the circumferential-direction center of the half bearing 42BU where the amount of change in the gap from the surface of the second journal 62 becomes maximum (the opening of the oil hole 45G does not exist), which leads to the increased effect of increasing the temperature of the oil and decreasing the viscosity thereof quickly at an early stage in particular at the cold start of the internal combustion engine at a low temperature. In addition, as illustrated in FIG. 15 (which illustrates the shape of the oil hole 45 when viewed along an arrow Y in FIG. 13), the opening of the oil hole 45 of the upper half bearing 42BU in accordance with this embodiment is sized and dimensioned to have a shape of an elongated hole, whose long axis is defined to be parallel to the circumferential direction of the upper half bearing 42BU whilst the short axis thereof is defined to be parallel to the axis direction of the upper half bearing 42BU. As an example of the dimensions of the elongated hole, it suffices that the long axis is in the order of 5 to 10 mm and the short axis in the order of 3 to 5 mm. Meanwhile, the dimensions of this elongated hole are merely one example and other dimensions may be adopted therefor.

It should be noted that the oil hole 45 of the upper half bearing 41U of the first main bearing 41 can be sized and dimensioned to have the same elongated-hole shape as that of the oil hole 45 of the upper half bearing 42BU.

It should be noted that the number of the oil holes 45 of the half bearing 41U and the half bearing 42U is not limited to one and two or more oil holes 45 may be provided.

The invention claimed is:

1. A bearing apparatus of a crankshaft for an internal combustion engine, the apparatus comprising a crankshaft having a plurality of journals and a plurality of crankpins, main bearings supporting the crankshaft, and a bearing housing holding the main bearings, in which:

the plurality of journals include a first journal and a second journal, the first journal having a lubricating oil passage for delivering oil to the crankpins of the crankshaft, the second journal not having the lubricating oil passage;

the first journal is supported by a first main bearing, the first main bearing being constituted by a pair of half bearings including an upper half bearing and a lower half bearing each having a shape of a half cylinder;

the second journal is supported by a second main bearing, the second main bearing being constituted by a pair of half bearings including an upper half bearing and a lower half bearing each having a shape of a half cylinder;

the bearing housing is constituted by an upper housing made of an aluminum (Al) alloy and an lower housing made of an iron (Fe) alloy, the upper housing having a half-cylinder surface adapted to be brought into alignment with an outer circumferential surface of the upper half bearing, the lower housing having a half-cylinder surface adapted to be brought into alignment with an outer circumferential surface of the lower half bearing, wherein the upper half bearings are configured to be held by the half-cylinder surfaces of the upper housing and the lower half bearings are configured to be held by the half-cylinder surfaces of the lower housing;

an internal oil passage for supplying oil to the first and second main bearings is formed inside of the upper housing, and an opening of the internal oil passage is formed in the half-cylinder surface of the upper housing;

only the upper half bearings out of the pairs of the half bearings respectively have an oil groove formed in an inner circumferential surface and at least one oil hole;

the oil holes extend through respective walls of the upper half bearings in a direction of the thickness of the walls and open in respective outer circumferential surfaces of the upper half bearings;

the opening of the internal oil passage of the upper housing and the oil groove are configured to be brought into communication with each other via the oil hole;

a crash relief is formed in each of the upper and lower half bearings at each of both circumferential-direction ends of the inner circumferential surface;

the range of formation of the oil groove of the upper half bearing of the first main bearing in the circumferential direction is defined such that each of both ends of the oil groove in the circumferential direction is in communication with the crash relief at a minimum and opens in an edge face in the circumferential direction of the upper half bearing at a maximum;

the oil groove of the upper half bearing of the second main bearing is formed for an entire length of the upper half bearing in the circumferential direction, and each of both ends in the circumferential direction of the oil groove is configured to open in corresponding each of both edge faces in the circumferential direction of the upper half bearing; and a region with a central angle of ±45° with reference to the central portion in the circumferential direction of the upper half bearings is defined as a ±45° region, and a depth of the oil groove of the upper half bearing of the second main bearing at least in the ±45° region is equal to or smaller than a half of a depth of the oil groove of the upper half bearing of the first main bearing in the ±45° region at a first corresponding location.

2. The bearing apparatus of the crankshaft for the internal combustion engine according to claim 1, wherein the depth of the oil groove of the upper half bearing of the second main bearing is equal to or smaller than a half of the depth of the oil groove of the upper half bearing of the first main bearing at second corresponding locations in a circumferential direction for the entire length in the circumferential direction.

3. The bearing apparatus of the crankshaft for the internal combustion engine according to claim 1, wherein the depth of the oil groove of the upper half bearing of the second main bearing is 0.5 mm at a maximum at least in the ±45° region.

4. The bearing apparatus of the crankshaft for the internal combustion engine according to claim 1, wherein the depth of the oil groove of the upper half bearing of the second main bearing is minimum at an end in the circumferential direction on a rear side in the direction of rotation of the second journal of the oil groove and increased toward an other end in the circumferential direction on a forward side in the direction of rotation of the second journal.

* * * * *